May 9, 1967

A. D. MAYFIELD ETAL  
THERMAL INSULATION SYSTEM 3,318,064

Filed Nov. 15, 1963

A.D. MAYFIELD  
M.H. KITE

INVENTORS

BY  E. M. Woodward

ATTORNEY

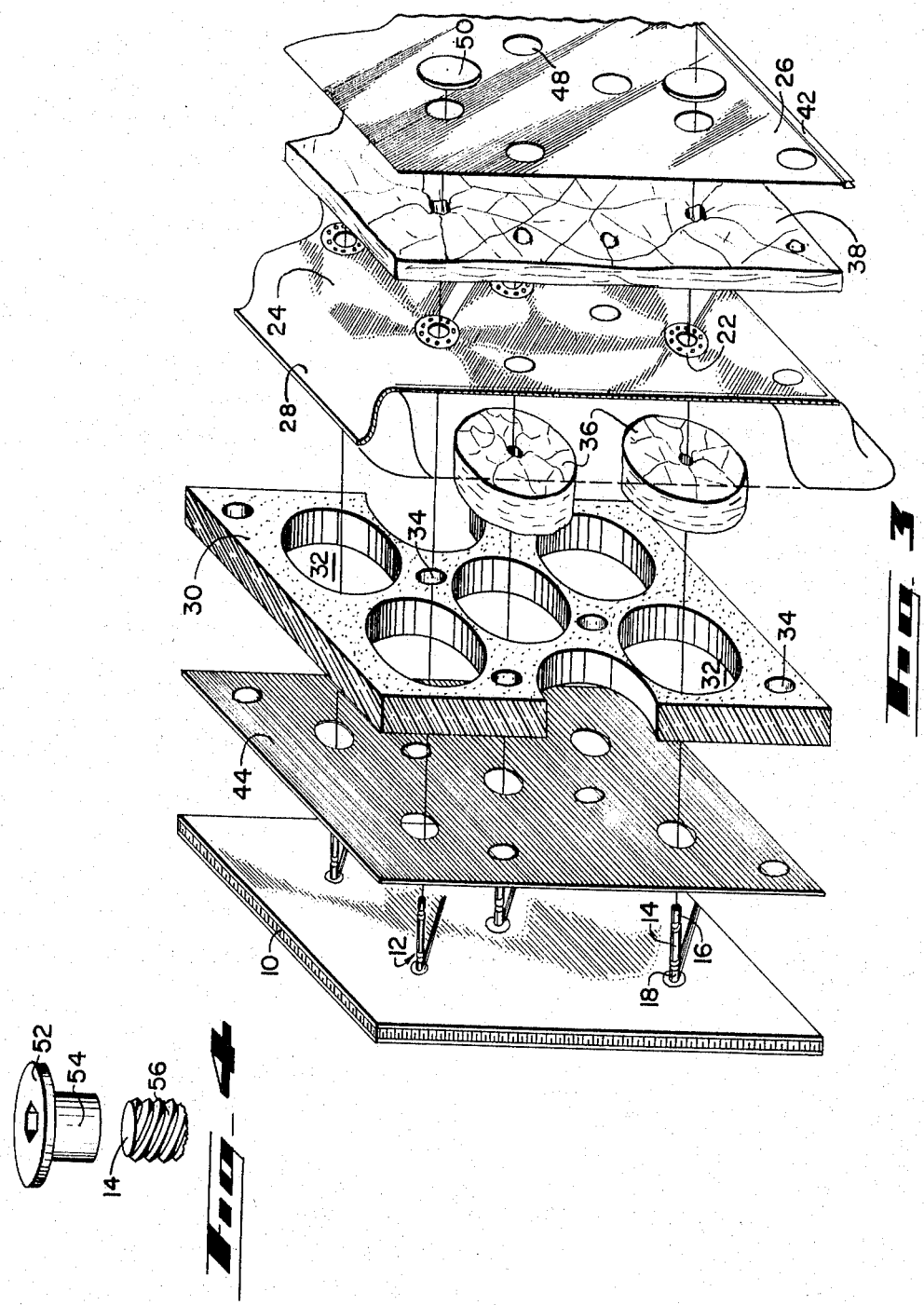

3,318,064
THERMAL INSULATION SYSTEM
Albert D. Mayfield and Mark H. Kite, Fort Worth, Tex., assignors to General Dynamics Corporation, Fort Worth, Tex., a corporation of Delaware
Filed Nov. 15, 1963, Ser. No. 323,997
9 Claims. (Cl. 52—613)

This invention relates generally to thermal insulation systems. More specifically the invention relates to a composite thermal resistant construction which utilizes integrated high and low density insulations to effect a high degree of protection for object structural members or bodies which it overlays and which is particularly well adapted for employment on boost-glide vehicles, spacecraft and the like because of its insulating efficiency and inherent light weight.

Thermal stresses which are imposed on the external surfaces of spacecraft during the departure and/or re-entry portions of their mission profiles are very deleterious in that when such stresses are transferred to the craft's structural components, failures will usually occur therein.

A prime desideratum in the design and construction of aerospace vehicles is that thermal insulation systems employed upon such vehicles must serve to preclude the hereinabove described structural failures, while also being capable of carrying all aerodynamic loads that may be imposed thereupon and transferring such loads to object structural members.

Should such an insulation system be incapable of transferring said loads, and insulation system failure would occur. As a consequence, the resultant thermal exposure would contribute to and in many instances cause the primary structure to fail. Furthermore, should such an insulation system's mass be made sufficient for purpose of structural integrity to give it the capability of withstanding these stresses and loads, then the weight of the insulation system would become intolerable for the intended operation of the vehicle.

Spacecraft embodying presently known insulation systems are restricted in their operation to limited and specific space missions because of such system's inherent high rate of heat transfer and excessive weight. Until the present era, it has been primarily the aerodynamic loads and stresses that have had to be anticipated by the designer. However, with the development of spacecraft and aerospace plane technology, thermal requirements of these vehicles have become exceedingly more acute due to the high speeds and resultant high temperatures at which they must operate. This increase in thermal requirements and the effect thereof on the structural and physical integrity of components results in virtual obsolescence of prior or conventional insulation construction as heretofore employed for space vehicle protection. These obsolete insulation systems are applicable to a specific type of vehicle whose flight profile will not require an ability to withstand extended aerodynamic heating. Of these known systems, only one has been found suitable for limited employment on vehicles which are exposed to extended aerodynamic heating. This system is based on insulation variation of the radiative type, in combination with a circulated heat absorbing media usually located between the understructure of the craft and the protective insulation.

An insulation variation of the radiative type possesses several deleterious characteristics which reside primarily in employing either a high density insulation or a low density insulation. Insulations based on a lightweight, low density material are employed in an effort to reduce total weight. However, such low density insulations are incapable of transferring aerodynamic loads and possess a high rate of thermal conduction, thus severely limiting their employment. Conversely, systems employing a high density insulation and capable of transferring aerodynamic loads, although possessing a low rate of thermal conduction, inherently have a very high relative weight. In most of the presently known systems, marginal at their best, efficiency is further reduced by utilization of metallic load carrying fasteners of high thermal conductivity. These fasteners are essential to systems in which the insulation is not capable of transferring the imposed aerodynamic loads, or in which the weight of the insulation is excessive.

In systems which incorporate a circulating heat absorbing media in conjunction with insulation, the efficiency of the system is greatly augmented. However, such systems are excessively heavy and impose weight and volume penalties upon the vehicle as heretofore noted. Furthermore, such systems are not always self-initiating with the consequence that a malfunction of the required pumping or conduit apparatus will have very serious effects. Magneto-hydrodynamic and thermo-electric type systems are presently being contemplated and studied but must be, for any practical purpose, projected far into the future.

Therefore, it is an object of the present invention to provide a composite lightweight thermal protection system in which a substantially low rate of thermal conductance is inherent, thereby facilitating its application to spacecraft and hyper-sonic vehicles which may be exposed to high temperatures for relatively prolonged periods.

Another object is to provide a thermal protection system which allows a given temperature to be maintained within a spacecraft when subjected to conditions of extreme temperature variation.

Still another object is the provision of a composite thermal protection system to achieve a lightweight structure capable of transferring aerodynamic loads in which a semi-rigid, quasi-structural insulation material of high density is integrated with a fibrous insulating material of low density.

A further object of this invention is the provision of a composite protection system applicable to spacecraft which employs non-metallic fasteners of low thermal conductivity as a means for attaching the various components of the system.

Other objects and many attendant advantages of this invention will be apparent from the following detailed description taken in conjunction with the drawings and appended claims. Further, the terms and expressions employed herein are terms of description and not limitation, and no intention in the use of such terms and expressions of excluding any equivalents of features shown and described or portions thereof is intended, but recognition is given to the fact that various modifications are possible within the scope of the invention claimed.

In the drawings:

FIGURE 3 is an exploded, isometric view of a system embodying the present invention showing the components thereof and their relationships each to the other;

FIGURE 4 is a perspective view of a variation of the means for attaching the outer heat shield.

Figure 1:
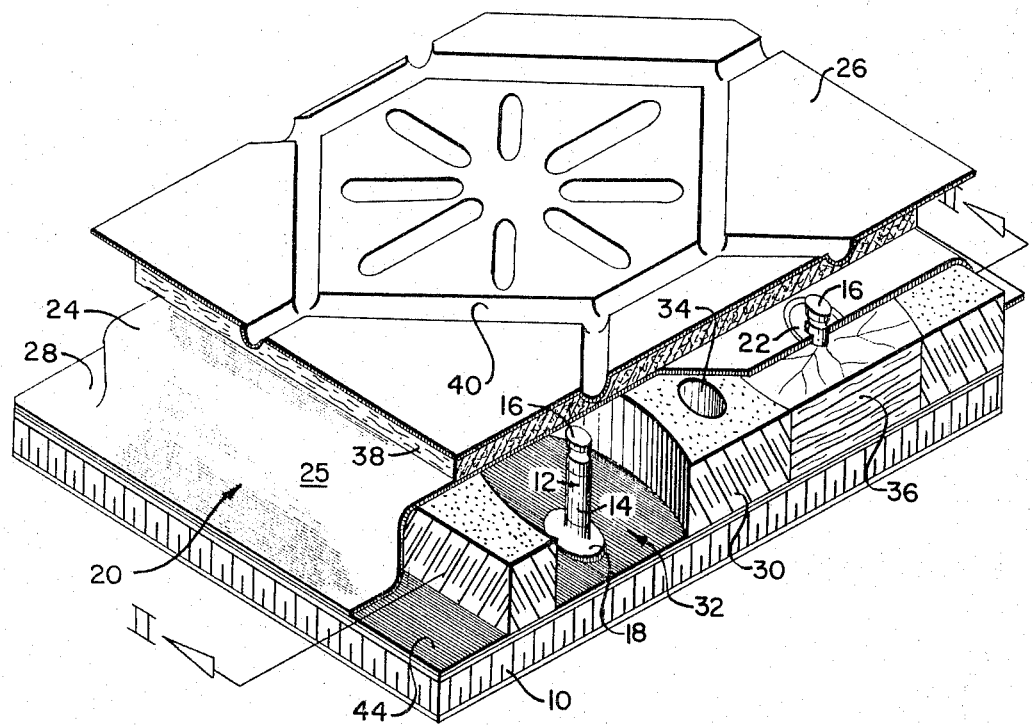
FIGURE 1 is a perspective view, partially in section, of the present invention with portions thereof cut away for clarity.
Figure 2:
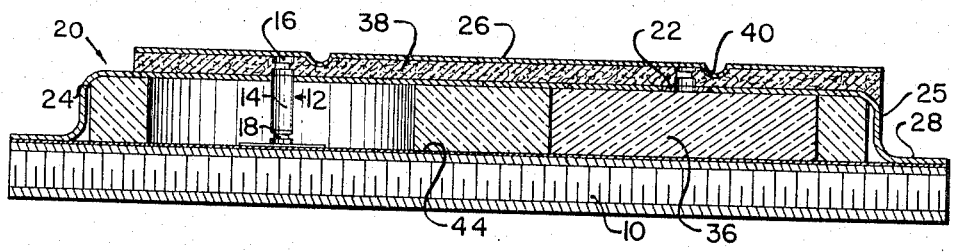
FIGURE 2 is an elevational, cross-sectional view of the insulation system of the present invention taken along reference line II—II of FIGURE 1.

Referring now to FIGURES 1, 2, and 3 in the drawings, the present invention is shown as comprising a structural panel 10 incorporating a plurality of fasteners 12 having substantially thermo-impervious cylindrical shanks 14, which shanks bear swaged-on metal cap elements 16 and 18 at either extremity. Fasteners 12 are attached, as by brazing, in a symmetrical, pre-determined pattern to the outer surface of structural panel 10 by lower cap elements 18. Fasteners 12 support and retain the components of the composite system in a contiguous and/or fixed relationship with structural panel 10. While it is the primary function of fasteners 12 to maintain this relationship they also enhance the effectivity of the composite thermal system through employment of substantially thermo-impervious shanks 14.

The elemental constitutents of the present invention are contained within individual packages or modules 20, modules 20, which are positioned over the outer surface 10 of the object vehicle, are supported upon and retained in part by fasteners 12. Therefore, it follows that modules 20, and the components thereof, must be apertured in a pattern commensurate with that predetermined for fasteners 12. Modules 20 are comprised of a high density (20–40 pounds per cubic foot) semi-rigid, quasi-structural insulation material 30 (such as Johns-Mansville Company's commercial Min–K 2000), fabricated in a configuration which embodies relatively large circular apertures 32 and small circular apertures 34, as best seen in FIGURES 1 and 3. The diameter of apertures 32 is determined by the strength and weight requirements of the system. In addition to the above function, apertures 32 preclude the development of stresses within the median plane of insulation 30. Following placement of insulation 30, apertures 32 are filled with multiple layers of low density (3–5 pounds per cubic foot) fibrous silica insulation 36, such as micro quartz or the like.

Insulation materials 30 and 36 are positioned in preformed, inverted, pan-like containers 24 having flanges 28 about the periphery thereof, as best seen in FIGURE 2. Containers 24 may be of .002" thick, high temperature resistant material such as refractory metal or super alloy sheets. These containers provide positive containment for insulation 30 and 36 when sealed with laminated sheet 44. Even though insulation 30 possesses a degree of structural integrity, it must be contained when subjected to vibratory stress loading.

Laminated cover sheet 44 may be of any material possessing high temperature resistance (such as phenyl-silane laminate) and is affixed to flanges 28 of containers 24 by any suitable means. Module 20 is thus formed by container 24 in conjunction with sheet 44, as shown in FIGURE 2.

Following positioning of modules 20, they are overlaid with a layer of low density, resilient insulation 38. Insulation 38 may be depressed into the depression between facing webs 25 of adjacent modules 20, and pressed across one face of module 20 by forcing fasteners 12 through the body of insulation material 38. Heat shield 26, which may be suitably embossed as seen at 40 in FIGURE 1, is positioned over insulation 38, bosses 40 acting to absorb and compensate for thermal expansion and contraction of shield 26 in relation to fasteners 12. This is in order to preclude imposition of stresses transverse to the fasteners. Obviously, embossed portions 40 are resilient, within limits, to prevent permanent deformation. Heat shield 26 is provided with expansion and contraction joints 42 (best seen in FIGURE 3) to permit differential expansion and contraction of one sheet relative to the adjacent sheet, and in addition, permits access to the sub-sheet components. On installation, shield 26 is depressed upon insulation batt 38, toward panel 10. This compresses insulation 38 and positions shield 26 on cap 16 of fastener 12. With shield 26 uniformly positioned and abutting caps 16, a braze is effected there-between, thus retaining the module and providing a means for reflecting a portion of the imposed heat flux.

Another embodiment of heat shield 26, as seen in FIGURE 3, omits embossed pattern 40, thereby permitting its being apertured in the same manner as the other components; apertures 48 being of sufficient diameter to provide for thermal expansion and contraction, relative to fasteners 12.

The components in the final assembly are then retained by means of discs 50 (FIGURE 3), welded to cap 16 of fastener 12, or by slotted discs 52 (FIGURE 4) having internally threaded caps 54 adapted for cooperation with threads 56 which are incorporated in non-metallic shank 14. This construction thus permits removal of a portion of the heat shield 26 between expansion joints when it becomes necessary or desirable to gain access to insulation layer 38, or to the individual modules 20 to repair or replace damaged components.

The hereinabove described self-initiating composite thermal protection system has a substantial weight advantage over known aerospace vehicle protective systems, weighing only 1.23 pounds per square foot. During a typical 25 minute re-entry profile, the outer heat shield 26 attained an equilibrium temperature of 1600° F. after 6 minutes and remained at this temperature for the next 15 minutes of the cycle until heating was terminated. During the same 25 minute re-entry profile, the protected structural panel 10 attained a temperature of only 300° F. after 11 minutes of exposure and only 610° F. after 23 minutes of exposure.

In a report, No. TND–1237, published in March 1962 by the National Aeronautics and Space Administration, summarizing research conducted at the Langley Research Center, many known thermal protection systems were evaluated. The one system which most closely approached that of the present invention in weight fell far short in results. This system was exposed to a portion of a typical re-entry profile. During such exposure, the outer heat shield quickly reached, and was then held, at a temperature of 1900° F. In only five minutes, the outer surface of the protected structural panel, corresponding generally to panel 10 of the present invention, attained a temperature of 900° F. This system weighed approximately the same as the system of the present invention, yet, as is obvious, its equilibrium temperature was 300° F. higher, while the temperature of the protected structural panel attained a temperature three times as high in less than one-half the time. After an exposure time substantially five times as long as that of the device evaluated in the above report, the panel temperature of the present invented structure was still only two-thirds as high. In many of the other systems reported in the above publication, all were excessively heavy and the temperature differentials between surfaces of all were measured in seconds.

In view of the above, the advantages of the construction of the present invention will be readily apparent to those skilled in the art. It should be here noted that various substitutions or addition of materials or variations in thickness may be made within the scope of the present invention to vary strength, thermal resistance and longevity, while simultaneously maintaining a very favorable thermal conductivity to weight ratio as taught herein.

An absorptive means, such as liquids or gases, may be added to the system to greatly increase its utility without serious weight penalties, due to the very low rate of thermal conductivity and relative low initial weight of the disclosed structure.

As thus described, the thermal protection system of the present invention may be characterized as an improved "insulation variation of the radiative type" system, employing a high density insulation material and a low density insulation material integrated within and encapsulated by a sealed container, thus forming an insulation module possessing a low weight and high strength to conductivity ratio. These modules are placed adjacent to and in a contiguous relationship with a structural panel and are supported by a plurality of non-metallic fasteners; the modules being covered with a blanket of low density insulation and an outer heat shield suitably retained by the fasteners for containment of the various components. One feature of this insulation system is its versatility, or adaptability, for various projected environmental conditions. Without altering the fundamental design or manufacturing concepts, individual elements within the system may be varied. For example, the total system thickness, the ceramic fastener pattern, the insulation densities or the heat shield material may be individually tailored to suit a specific configuration without affecting the primary structure. This feature is extremely significant for it provides a latitude of growth potential for thermal conditions that may not be firmly established when a vehicle structure is being designed. Or, if prototype flight testing reveals more extreme thermal conditions than predicted, a minimum effort and cost is required to accommodate the increased heat input by modifying only the external insulation systems.

What is claimed is:

1. A light weight, composite, thermal insulation system comprising:
   (A) at least one low thermally conductive fastener adapted for attachment to a structural member;
   (B) at least one insulation module positioned over said fastener and comprising:
      (1) a first insulating material of high density, quasi-structural, semi-rigid board form, said material having at least one aperture therein operative to fit over said fastener,
      (2) a second insulating material of low density, fibrous layered form,
         said second insulating material positioned in said aperture in said first insulating material and around said fastener,
      (3) a highly heat resistant, pan like member containing said first and second insulation material on at least three sides to thus form said module, said member having an aperture therein corresponding in position to said fastener,
      (4) a high temperature-resistant sheet element attachable to the open end of said pan member and interposed between said pan and the structural member to thereby encapsulate said module,
   (C) a low density, fibrous insulation blanket overlaying said module and surrounding a portion of said fastener passing therethrough; and
   (D) a heat shield of refractory material overlaying said insulation blanket and attached to said fastener at the end remote from said structural panel and forming an integrated, thermally low conductive insulation system.

2. A light weight composite insulation system comprising:
   (A) a structural base member;
   (B) a plurality of thermally low conductive fastener means having means for perpendicular attachment to said structural member;
   (C) a plurality of modules positionable over and securable to said fasteners, each of said modules comprising:
      (1) a pan-like member of refractory metal having means therewith to compensate for dimensional changes imparted thereto by heat,
         (a) said members having apertures therein corresponding in position to said fastener means,
         (b) said member having means on the open end thereof for securement of a cover means,
      (2) means providing an insulation medium within said pan-like member, and
      (3) a high temperature, laminate cover element secured over said pan member, said cover element being apertured to correspond to said fastener means and forming a modular insulative structure,
   (D) an insulation material positioned over said modules, said fastener means extended through said material; and
   (E) a heat shield overlaying and compressing said insulation material and secured to said fastener means, said shield having means compensating for expansion and contraction thereof.

3. The composite insulation system as set forth in claim 2, wherein:
   (A) each said fastener means comprising an elongate ceramic element having a refractory metal cap secured at each end thereof, said cap having a substantially planar outer end for attachment to said structural member on one end and said heat shield on the other.

4. A composite, light weight, load sustaining insulation system for use with a structural panel comprising:
   (A) each said fastener means comprises an elongate ceramic fasteners having means at one extremity for perpendicular attachment to the structural panel and at the other extremity for securement of a heat shield;
   (B) individual insulation modules apertured for positioning over said fasteners and contiguous to the structural panel, each said module comprising:
      (1) at least one pan-like member having flanged edges extending toward the structural panel operative to provide a securement means for a module cover element and defining the lateral and transverse periphery of said module,
      (2) a first insulation material contained within said pan-like member, said material apertured for positioning over said fasteners,
      (3) a second insulation material positioned between said fasteners and the walls of said first insulation material apertures, and
      (4) a cover sheet attached to said pan-like member flanged edges and encapsulating said insulation materials to thus constitute said individual modules;
   (C) an insulation material superjacent to and interpositioned between said modules and having said fastener means extending therethrough; and
   (D) a heat shield secured to said fastening means at the extremity removed from the structural panel to be insulated, said shield operative to retain all components of said system in position on said fasteners.

5. The composite insulation system as defined in claim 4, wherein:
   said perpendicular attachment means and said heat shield securing means on said ceramic fasteners comprise super alloy metallic caps swaged thereon.

6. The composite insulation system as defined in claim 4, wherein:
   (A) said first insulation material comprises high density, semi-rigid, structural insulating material fabricated in board form, said apertures forming cells for containment of a second insulation material; and
   (B) said second insulation material being comprised of individual layers of low density fibrous material in blanket form.

7. The composite insulation system defined in claim 6, wherein:
   (A) said first insulation material consists of approximately 80% pure silica fibers; and
   (B) said second insulation material consists of approximately 98% pure silica fibers,
   (C) said cover sheet comprises a high temperature phenyl silane laminate interposed between said pan flanges and the structural panel.

8. The composite insulation system defined in claim 6, wherein:
   said material superjacent said modules is a blanket-like layer of resilient, low density fibrous insulation material similar in composition to said second insulation material.

9. The composite insulation system as defined in claim 4, wherein:

said heat shield is a super alloy or refractory metal sheet having expansion and contraction compensation means integral therewith, and expansion joints between said sheet members.

References Cited by the Examiner

UNITED STATES PATENTS

| 2,280,647 | 4/1942 | Hawes | 52—410 X |
| 2,837,788 | 6/1958 | Mazzacco | 52—615 |
| 3,161,265 | 12/1964 | Matsch | 52—615 |

DAVID J. WILLIAMOWSKY, *Primary Examiner.*

HARRISON R. MOSELEY, *Examiner.*

P. M. CAUN, *Assistant Examiner.*